INVENTOR
ROBERT H. DYE

BY James L. O'Brien
ATTORNEY

INVENTOR

ROBERT H. DYE

BY

James L. O'Brien

ATTORNEY

INVENTOR
ROBERT H. DYE

BY James L. O'Brien

ATTORNEY

United States Patent Office 3,394,367
Patented July 23, 1968

3,394,367
SYMBOL GENERATOR
Robert H. Dye, Ann Arbor, Mich., assignor to The Bendix Corporation, Ann Arbor, Mich., a corporation of Delaware Filed July 14, 1965, Ser. No. 471,823
19 Claims. (Cl. 340—324)

ABSTRACT OF THE DISCLOSURE

An electronic display system having a symbol generator providing a first curved stroke beginning in the X direction and ending in the Y direction, a second curved stroke beginning in the Y direction and ending in the X direction and a straight stroke. The symbol generator is responsive to signals defining the end points of the strokes and the stroke type thereby permitting generation of any symbol through sequential display of preselected combinations of the above strokes.

This invention relates to electronic displays and more particularly to a "stroke-type" symbol generator for generating analog signals representing individual symbols each of which is composed of successive lines or strokes.

One type of high speed digital computer includes a cathode ray tube display operated under command of a computer. Normally the computer is operated cyclically to repeatedly perform operations on incoming data according to the computer program. The operating cycle of the display is divided between command data input and display data output. During the data output portion of the cycle instructions read from a computer storage are used to generate a display frame on the cathode ray tube. The display frame is composed of symbols whose type and location on the display are derived from computer storage in digital form. An input-output buffer reads instructions for each symbol including both symbol type and symbol location instructions and then transfers the location instructions to a line generator and the type instructions a symbol generator. The line generator is used to locate a particular display area on the cathode ray tube where the symbol generator then causes a specified symbol to be generated. Instructions for each symbol are transferred successively in time sequence by the buffer and the symbols are displayed individually in accordance with that sequence to make up a complete display frame. Each symbol display is in turn composed of successive lines or strokes displayed at the specified symbol display area.

For example symbol position may be specified with a nine bit resolution in the X (horizontal) direction and a nine bit resolution in the Y (vertical) direction, yielding a 512 by 512 array of possible point locations. Symbols may be positioned at any of the possible locations independently of the previous symbol location. By appropriate control of the beam in the cathode ray tube, visible lines are produced to create a display. Since the lines may be used for velocity vectors and reference lines for graphs or maps, etc., it is important, if not essential, that displayed lines be straight and considerable effort is expended to insure this result. However, when only straight line strokes are used a large number of strokes is required to produce a satisfactory replica of many symbols having curved configurations. For example, twenty strokes may be required to satisfactorily reproduce a figure "8" when small straight line segments are used.

Therefore the objects of the present invention are to provide an electronic symbol display system that is particularly suited for use in a computer operated display; that effectively produces high quality symbols; that minimizes the number of strokes necessary to produce a symbol display of high quality and thus minimizes the time required for each symbol display; that minimizes discontinuities at stroke junctions to further enhance the quality of the symbols; and that is capable of displaying curved or linear strokes whose end points are randomly addressable on the display to provide great versatility.

Other objects of the present invention are to provide a symbol generator capable of generating a display having the above enumerated advantages.

Generally in accordance with one important aspect of the present invention, it has been found that if curved line strokes are provided in addition to straight line strokes, symbols of high quality may be produced. Each symbol requires a minimum number of strokes or position transitions and thus the display time required for certain symbols is reduced substantially. Each stroke of the symbol requires only minimum digital information. By way of illustration and not for purposes of limitation it has been found that high quality symbols can be generated with a maximum of ten strokes connecting any two points in an 8 by 8 array of points in each symbol display area. Quarter-elliptical lines are generated in addition to straight lines with the curved lines having either a horizontal or a vertical initial slope. For this arrangement a total of eight bits of information is required at the beginning of each new stroke for a total of ten strokes. Six of the bits are interpreted as end point positions in the 8 by 8 display area, that is, three bits in the X direction and three bits in the Y direction. The remaining two bits are used to designate which of four kinds of lines are to be produced for that stroke. The first of the two bits specifies whether the line is to be curved or straight. If the line is curved, the second bit specifies either a horizontal or a vertical initial slope. If the first bit calls for a straight line the second bit specifies whether the line is to be blanked or unblanked. Curved lines are always displayed since there is no necessity in curving a line if it is not to be displayed.

Other objects, features and advantages of this invention will become apparent from a consideration of the following description the appended claims and the accompanying drawings in which:

Figure 3A:
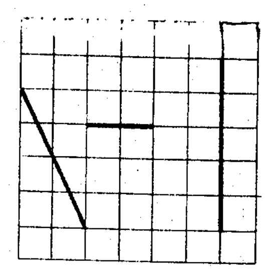
Figure 3B:
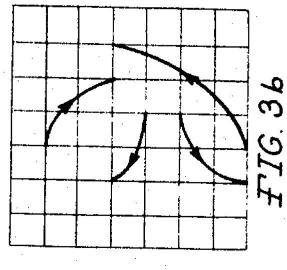
Figure 3C:
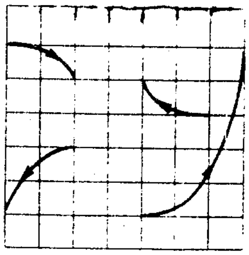
Figure 4:
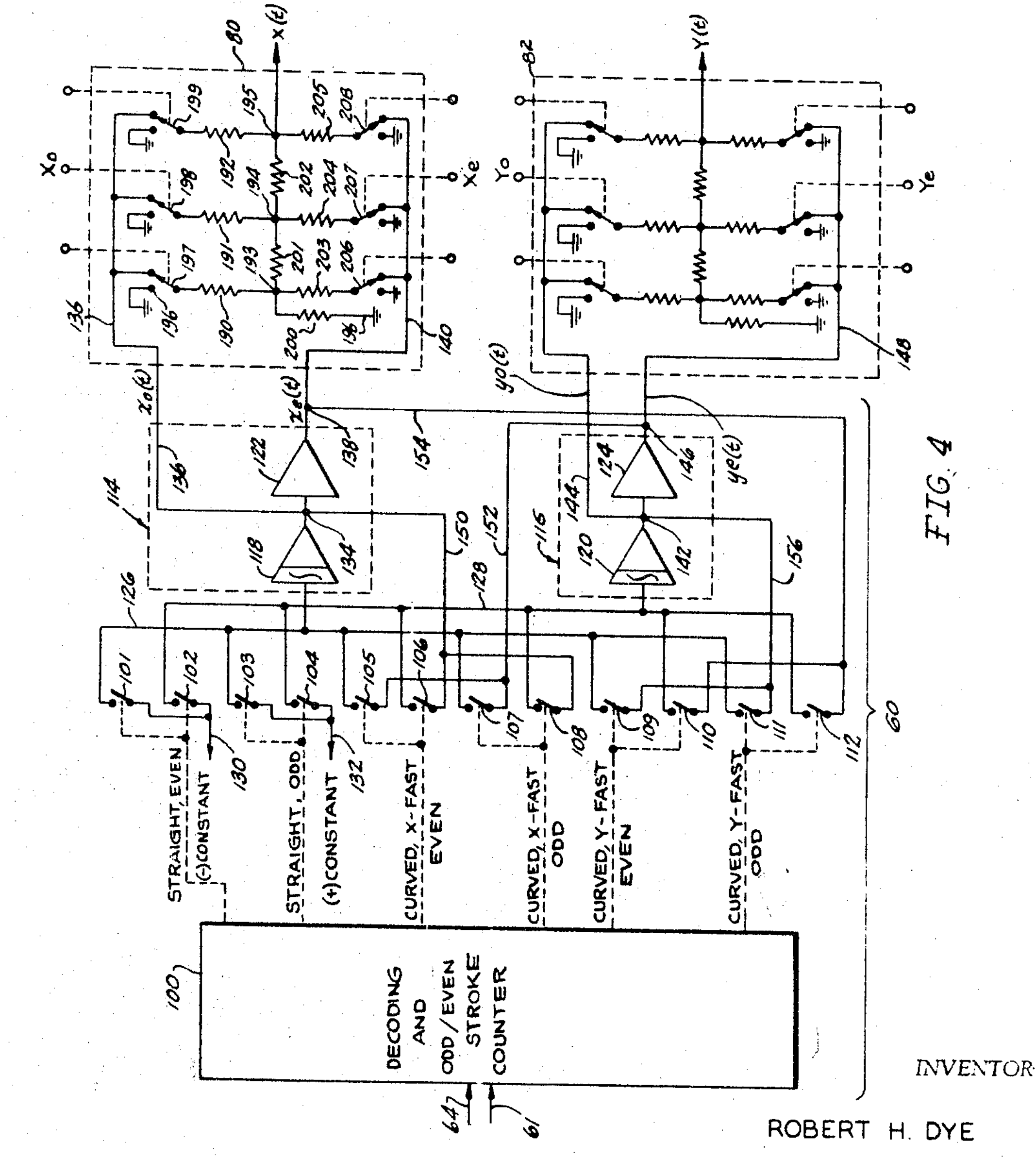
Figure 5A:
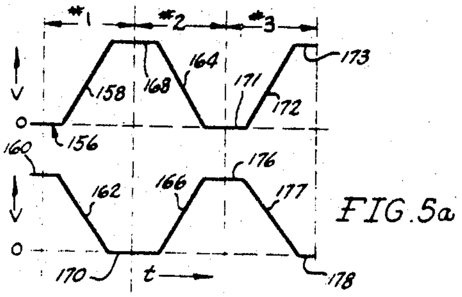
Figure 5B:
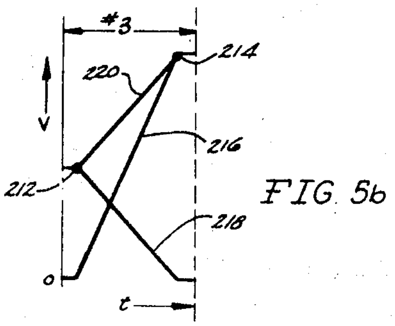
Figure 6A:
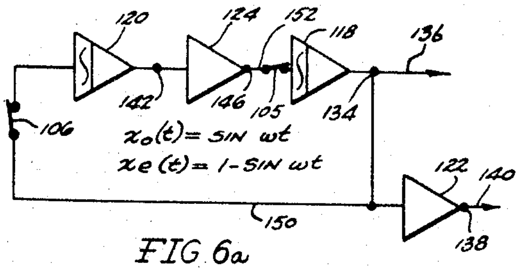
Figure 6B:
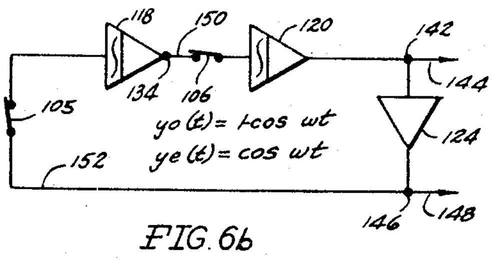
Figure 6C:
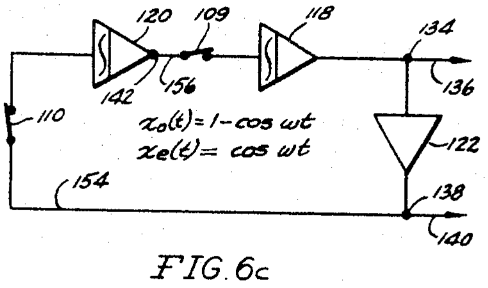
Figure 6D:
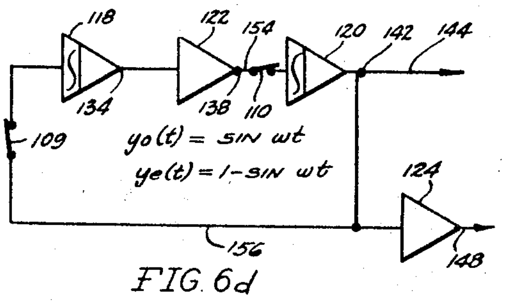
Figure 7:
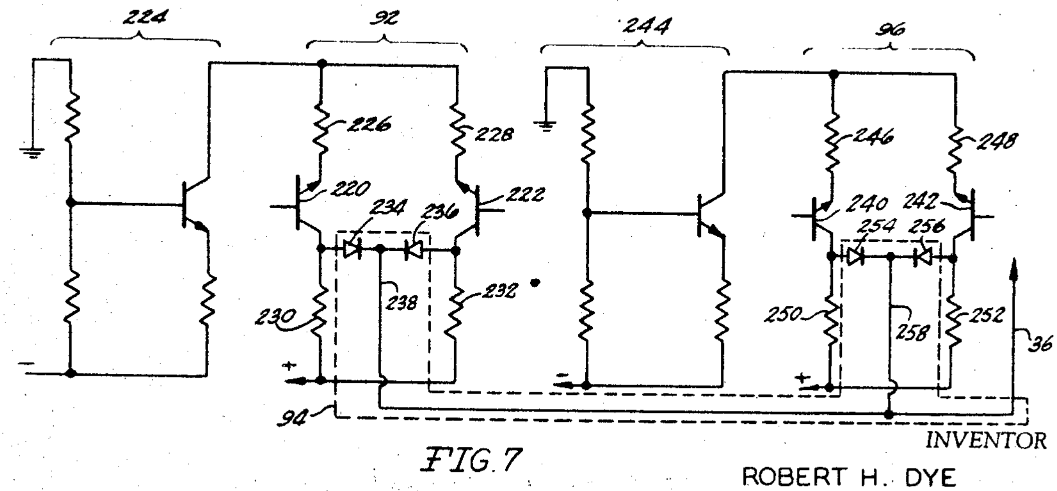

FIGURES 3*a*, 3*b* and 3*c*, respectively, illustrate unblanked straight lines, curved lines having a horizontal beginning and a vertical ending, and curved lines having a vertical beginning and a horizontal ending;

FIGURE 4 is a functional circuit diagram partially in block form of a portion of the symbol generator that includes a pair of digital-analog multipliers which determine the end point of each stroke and a pair of function generators which are selectively switched to provide analog signals related to either straight line or curved line strokes;

FIGURES 5*a* and 5*b* illustrate wave forms present in one function generator and one multiplier for the production of a straight line stroke;

FIGURES 6*a*, 6*b*, 6*c* and 6*d* are block diagrams showing connections between a pair of integrators and a pair of off-set inverters in the function generators for providing sine and cosine functions used to generate curved lines having either a horizontal or a vertical initial slope; and FIGURE 7 is a circuit diagram of a difference taking circuit for maintaining the intensity of the display substantially constant with strokes of different lengths.

Referring to the data display system illustrated in FIG. 1 a generally conventional cathode ray tube 12 comprises an electron gun 14 for producing a beam which is deflected horizontally and vertically along orthogonal axes of tube 12, referred to hereinafter as the X and Y axes or directions, by a pair of deflection coils 16, 18 to generate a luminous visual display on a screen 20 of tube 12. Coils 16, 18 are energized by analog signals from X and Y deflection amplifiers designated collectively by numeral 22 which in turn are energized by analog signals from a symbol generator 26 (enclosed in dash lines in FIG. 1) and a line generator 28. In general signals from line generator 28 are analog representations of a discrete display area 29 (FIG. 2) on screen 20 whereas the signals from generator 26 are analog signals for generating a particular symbol display on the display area 29 specified by line generator 28. Gun 14 is energized by signals from a Z axis modulator 30 which in turn receives blanking and unblanking signals from the symbol generator 26 via a line 32 and intensity varying signals from an intensity control 34 via line 36. The intensity control 34 may be considered a part of symbol generator 26 although it is designated separately by a dash line in FIG. 1 since it is not essential to the operation of the symbol generator to provide a symbol display. Symbol generator 26 and line generator 28 are each connected to an output buffer 36 via lines 38, 40, respectively, with buffer 36 in turn being connected to a digital storage 41 which may be under the control of a computer (not shown) for processing incoming data in accordance with a computer program in a well known manner. Buffer 36 reads instructions from storage 41 for each symbol to be displayed and then successively transfers the instructions for each symbol to symbol generator 26 and line generator 28.

Symbol generator 26 utilizes four basic stroke types in drawing a symbol at a display area 29: (1) blanked straight lines; (2) visible straight lines (FIG. 3*a*); (3) curved, quarter-elliptical lines with a horizontal beginning and a vertical ending, hereinafter called X-fast (FIG. 3*b*); and (4) curved, quarter-elliptical lines with a vertical beginning and a horizontal ending, hereinafter called Y-fast (FIG. 3*c*). These particular types of strokes minimize the number of actual stroke movements necessary to create a high quality symbol. The use of curved strokes for constructing many of the common alphanumeric characters produces symbols of typewriter quality. Since quarter-elliptical lines are used with vertical or horizontal beginning and ending, undesirable discontinuities at stroke junctions are eliminated. High quality symbols can be generated with a maximum of ten strokes connecting any two points in an 8 by 8 display array 29 (FIG. 2). The capability of stroking from any point to any other point in the array is significant in keeping the number of strokes per symbol at ten or less.

With the 8 by 8 array 29, eight possible termination values in the X (horizontal) direction and eight in the Y (vertical) and four possible stroke types require that each stroke be defined by eight bits of information. Three bits are required to determine the horizontal coordinate of the stroke destination and three bits for the vertical coordinate. The remaining two bits are used to designate which of the four stroke types will be produced. The first of these two bits determines whether the stroke is to be straight or curved. If a straight stroke is to be generated, the second bit determines whether or not the stroke is to be displayed. If a curved stroke is to be generated, the second bit determines whether the stroke begins horizontally or vertically.

Figures 1, 2:
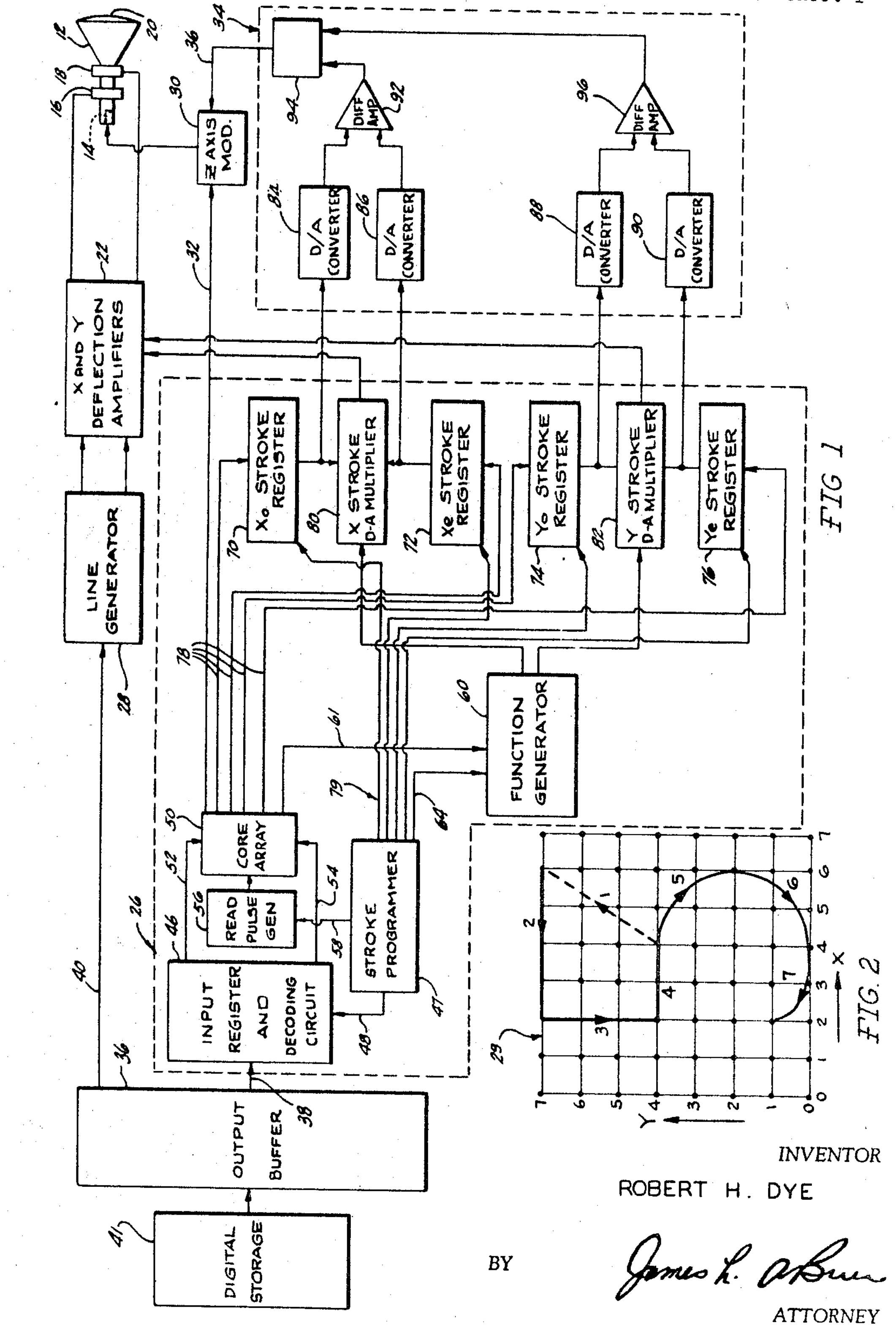
FIGURE 1 is a simplified block diagram of a data display system constructed in accordance with the present invention and including a line generator and a symbol generator which provide analog deflection voltages to a cathode ray tube for generating symbol displays composed of straight line strokes, curved line strokes or combinations thereof.
FIGURE 2 illustrates an 8 by 8 symbol display area on which the numeral "5" is displayed to illustrate types of lines produced in accordance with one important aspect of the present invention.

FIG. 2 illustrates how the numeral five is produced using seven strokes. The first stroke, an example of type 1, is blanked. The second, third and fourth strokes are all displayed straight strokes. Strokes five and seven which begin by moving horizontally and end vertically demonstrate the use of the type three stroke. The sixth stroke is curved representing stroke type four.

Symbol generator 26 comprises an input register and decoding circuit 46 which receives digital inputs from buffer 36 designating a particular symbol to be displayed on screen 20. For example if the symbol repertoire of generator 26 is sixty-four characters, input circuit 46 will receive a six-bit input from buffer 36 to designate which of the characters is to be displayed. Input circuit 46 is also connected to a stroke programmer 47 via a line 48 to receive an initiate pulse. Programmer 47 serves as a source of timing and control pulses for the generation of each symbol. On command of programmer 42 input circuit 46 sets a core array 50 through source lines 52 and sink lines 54 for the symbol to be displayed. With eight bits for each stroke and a maximum of ten strokes per symbol display, core array 50 is an 8 by 10 array and eight lines are included in each of the source lines 52 and the sink lines 54 to set one of sixty-four wires in array 50 which in turn sets one core pattern as required by the particular symbol associated with that one wire. A pulse generator 56 is also connected to core array 50 to sequentially read the cores set by lines 52, 54 upon receipt of a timing pulse from programmer 47 via a line 58 for each stroke. A maximum of eight bits at a time for each of the ten strokes are read from array 50 until all eighty cores have been read at the completion of a symbol. For each stroke data from array 50 two bits are routed to a function generator 60 (via a line 61) to designate whether the stroke is a curve line or a straight line. For purposes that will later be apparent alternate strokes in the stroke sequence used to generate each symbol are designated as either an odd stroke or an even stroke. Function generator 60 also receives control pulses from programmer 47 via a line 64 identifying the data from array 50 as either odd stroke data or even stroke data.

Two bits from array 50 supplied to function generator 60 are also routed to modulator 30 via line 32 to blank the beam in tube 12 when the stroke is not to be displayed (stroke type #1). Four stroke registers 70, 72, 74, 76 are also connected to array 50. Registers 70, 72 each receive three bits of X designating an end point of strokes in the X direction whereas registers 74, 76 each receive three bits of Y via lines designated collectively by numeral 78. For purposes that will later be apparent registers 70, 74 are associated with odd strokes as designated by a subscript *o* and registers 72, 76 are associated with even strokes as designated by a subscript *e*. On an even stroke, registers 72 and 76 contain the X and Y end points for the even stroke to be displayed whereas registers 70 and 74 contain the X and Y end points of the next preceding odd stroke which represent the position of the beam on screen 20 at the termination of the next preceding stroke. Similarly registers 70, 74 contain end points for an odd stroke to be displayed whereas registers 72, 76 contain end points of the preceding even stroke. By way of further illustration array 50 may have a fourteen wire output. Two of the wires are connected to function generator 60 and to modulator 30. Three wires are connected to register 70 and three wires are connected to register 74 from odd stroke cores in array 50. Similarly three wires are connected to register 72 and three wires are connected to register 76 from even stroke cores. Registers 70–76 also receive control pulses from programmer 47 via lines designated collectively by numeral 79 prior to read-out of array 50 by generator 56 to reset the registers to a number corresponding to a common starting point for each symbol in the display array 29. Preferably registers 70–76 are reset at the completion of each symbol. Registers 70, 72 are each connected to an X-stroke digital-analog multiplier 80 and registers 74, 76 are each connected to a Y-stroke digital-analog multiplier 82. The output of function generator 60 is also connected to multipliers 80, 82 for supplying analog signals to the multipliers 80, 82 where they are multiplied in accordance with the digital signal from registers 70–76. Multipliers 80, 82 have their outputs connected to the deflection amplifiers 22.

The digital end points in registers 70, 72 are also routed to a pair of digital-to-analog converters 84, 86, respectively, in the intensity control 34. Similarly the digital end points are taken from registers 74, 76 and routed to a pair of digital-to-analog converters 88, 90. Converters 84, 86 are connected to a difference amplifier 92 to obtain a difference signal which is applied to a selection circuit 94. Similarly a difference amplifier 96 derives a difference signal representing the difference between the analog outputs from converters 88, 90 and applies this difference signal to the selection circuit 94. The difference signals are related to the length of a stroke resolved along the X and Y axes, respectively. Circuit 94 determines the larger of the two difference signals and applies the largest signal to modulator 30 for controlling the intensity of the beam in a manner related to the length of the stroke. At the completion of each symbol display registers 70, 72, 74, 76 are reset by programmer 47.

Referring to FIG. 4 the function generator 60 (FIG. 1) includes a decoding and counting circuit 100 which receives two bits from array 50 (FIG. 1) via line 61 and control pulses from programmer 47 via line 64. Circuit 100 interprets the data from array 50 as either a straight line; a curved line having a horizontal beginning (X-fast); or a curved line having a vertical beginning (Y-fast). Circuit 100 also identifies the data from programmer 47 for alternate strokes, that is for an odd stroke or for an even stroke. The output from circuit 100 controls twelve electronic switches 101–112 functionally illustrated in FIG. 4 as single-pole single-throw switches. Function generator 60 also comprises an X function generator 114 and a Y function generator 116 each of which includes an integrator 118, 120, respectively, whose output is applied to an inverter 122, 124, respectively. Switches 101, 102 connect the input of integrators 118, 120 to a constant negative supply through a pair of lines 126, 128 and a common line 130. Switches 103, 104 connect integrators 118, 120 a constant positive supply via lines 126, 128 and a common line 132. Switches 105–112 are arranged to interconnect integrators 118, 120 with inverters 122, 124 in accordance with well known differential analyzer techniques to produce sine and cosine functions for curved strokes. Integrator 118 has an output terminal 134 connected to multiplier 80 by a line 136. Inverter 122 has an output terminal 138 connected to multiplier 80 by a line 140. Similarly integrator 120 has an output terminal 142 connected to multiplier 82 by a line 144 while inverter 124 has an output terminal 146 connected to multiplier 82 by a line 148. For generating an even X-fast stroke the output terminal 134 of integrator 118 is arranged to be connected through a line 150 and switch 106 to the input of integrator 120 and the output terminal 146 of inverter 124 is connected through a line 152 and switch 105 to the input of integrator 118 as shown in FIGS. 6*a* and 6*b*.

For an odd X-fast stroke, terminal 134 is connected through line 150 and switch 108 to the input of integrator 120 whereas the output terminal 146 of inverter 124 is connected through line 152 and switch 107 to the input of integrator 118 to provide circuits functionally identical to those shown in FIGS. 6*a* and 6*b*. For an even Y-fast stroke the output terminal 138 of inverter 122 is connected through a line 154 and switch 110 to the input of integrator 120 whose output terminal 142 is connected by a line 156 and switch 109 to integrator 118 to provide the circuit arrangements illustrated in FIGS. 6*c* and 6*d*. For an odd Y-fast stroke circuit connections corresponding to those illustrated in FIGS. 6*c* and 6*d* are provided with terminal 138 being connected through line 154 and switch 112 to the input of integrator 120 whose output terminal 142 is connected through line 156 and switch 111 to the input of integrator 118. Regardless of the stroke being generated the output at terminal 138 will always be an inverse function of the output at terminal 134. As used in this application the term "inverse function" denotes some function $f(t)$ and another function equal to $1-f(t)$. For example $\sin \omega t$ and $1-\sin \omega t$ are inverse functions as that term is used in this application.

More particularly for the four stroke types, that is, straight line (blanked or unblanked, X-fast (curved), and Y-fast (curved) deflection signals at coils 16, 18 can be resolved into either linear or sinusoidal functions. Components for the X and Y directions are generated by interconnecting intergrators 118, 120 and inverters 122, 124 in accordance with the two control bits from array 50. The function generator 60, FIG. 1 (114, 116, FIG. 4) produces four analog waveforms for digital-analog multipliers 80, 82: $x_o(t)$ at terminal 134; $x_e(t)=1-x_o(t)$ at terminal 138; $y_o(t)$ at terminal 142; and $y_e(t)=1-y_o(t)$ at terminal 146. The odd and even subscripts of the outputs at terminals 134, 138, 142, 146 indicate that the output will be multiplied by odd or even stroke and points, respectively.

For the generation of a straight line stroke, a linear ramp function is desired. The first derivative of such a function is a constant, and the required input to each integrator 118, 120 is a positive constant (switches 103, 104) for odd numbered strokes and a negative constant (switches 101, 102) for even numbered strokes. With this convention, both $x_o(t)$ and $y_o(t)$ increase during strokes 1, 3, 5, 7, and 9, and decrease during strokes 2, 4, 6, 8, and 10. FIG. 5*a* illustrates typical waveforms of $x_o(t)$ and $x_e(t)$ appearing at terminals 134, 138, respectively, for both even and odd straight strokes. The $x_o(t)$ output at terminal 134 is designated by numeral 156 and begins at zero with an increasing slope portion 158 during a first odd stroke designated as stroke #1 while the $x_e(t)$ output at terminal 138 designated by numeral 160 is a linearly decreasing portion 162, $1-x_o(t)$. During stroke #2, $x_o(t)$ has a decreasing linear portion 164 while $x_e(t)$ has an increased linear portion 166. Portions 158, 164 of waveform 156 are joined by a flat maximum portion 168 and portions 162, 166 of waveform 160 are joined by a flat minimum portion 170. By way of further illustration, waveform 156 may continue with time with a flat minimum 171, an increasing portion 172 (stroke #3) and a flat maximum portion 173. The waveform 160 continues with a flat maximum portion 176, a linearly decreasing portion 177 (stroke #3) and a flat minimum portion 178.

For the generation of curved lines, integrators 118, 120 and one of the inverters 122 or 124 are interconnected by switches 105–112. For an X-fast line which begins horizontally and ends vertically the initial X velocity should be large and the initial Y velocity should be zero. The first arrangement (FIG. 6*a*) for switches 105, 106; and the corresponding arrangement for switches 107, 108 is substantial like that used in analog computation to solve the differential equation:

$$\frac{d^2x_0(t)}{dt^2}+x_0(t)=0$$

where the solution for the odd strokes is:

$$x_0(t)=\sin \omega t$$

and, for the even numbered strokes:

$$x_e(t)=1-x_o(t)=1-\sin \omega t$$

The second arrangement (FIG. 6*b*) is also created for X-fast strokes and solves the differential equation:

$$\frac{d^2y_0(t)}{dt^2}+y_0(t)=1$$

whose solution is:

$$y_o(t)=1-\cos \omega t$$
$$y_e(t)=1-y_o(t)=\cos \omega t$$

In a similar manner the third connection (FIG. 6c) and the fourth connection (FIG. 6d) are made for a curved, Y-fast type stroke which requires an initial X velocity of zero and a large Y velocity. The third arrangement is identical in function to the second (FIG. 6b) and the fourth is identical in function to the first (FIG. 6a). Therefore, the following functions are generated:

$$x_o(t)=1-\cos \omega t$$
$$x_e(t)=\cos \omega t$$
$$y_o(t)=\sin \omega t$$
$$y_e(t)=1-\sin \omega t$$

The angular frequency of the sine and cosine waves is aljusted to provide exactly 90 degrees of phase rotation during one stroke time, so that the same voltages are reached at the end of a stroke whether the line was straight or curved in either of the two ways.

For any given stroke type between any two points in the 8 by 8 array 29, whether an odd or even stroke, the output of the function generator 60 is always the same. However, the amplitude of deflection signals, X($t$) and Y($t$), applied to amplifiers 22, must vary in accordance with the destination of the stroke.

The analog outputs $x_o(t)$, $x_e(t)$ at terminals 134, 138 of function generator 114 are routed to multiplier 80 by lines 136, 140. The analog outputs $y_o(t)$, $y_e(t)$ at terminals 146, 148 of function generator 116 are routed to multiplier 82 by lines 144, 148. Each of the digital-analog multipliers 80, 82 comprises a three node ladder network and associated analog switches which permit or prevent the injection of the analog output from function generators 114, 116 at each node in accordance with a three bit number, $X_o$, $X_e$, $Y_o$, $Y_e$ from registers 70, 72, 74, 76 (FIG. 1). Each three bit number represents X or Y coordinates of the display array 29 and causes the associated analog output from generators 114, 116 to be multiplied selectively by fractions ranging from zero through seven-sixteenths, in steps of one-sixteenths. Since multipliers 80, 82 are substantially identical in construction and operation only multiplier 80 will be described in detail.

Multiplier 80 comprises three input resistors 190, 191, 192 each of which has one end connected to a respective node 193, 194, 195 with the other end of each resistor arranged to be connected either to line 136 or to ground 196 through a respective electronic switch functionally illustrated as single-pole double-throw switches 197, 198, 199. Switches 197, 198, 199 are selectively operated by three bits $X_o$ provided by the $X_o$ stroke register 70 (FIG. 1). Nodes 193, 194, 195 are connected together and to ground 196 by three summing resistors 200, 201, 202 with node 195 serving as the X deflection signal, X($t$), output to amplifiers 22. Also connected to nodes 193, 194, 195, respectively, are three input resistors 203, 204, 205 each of which is arranged to be connected either to line 140 or ground 196 by a respective electronic switch illustrated as single-pole double-throw switches 206, 207, 208 selectively operated by three bits $X_e$ provided from the $X_e$ stroke register 72 (FIG. 1). Registers 70, 72 are three bit registers having eight possible states which represent integers zero through seven corresponding to X coordinates of the array 29. The values of resistors 190–192, 200–202, 203–205 are weighted such that by closing switches 196–198 or switches 206–208 as a representation of the three bit number from the associated registers 70, 72, the X($t$) output at node 195 is proportional to the sum of the analog inputs $x_o(t)$, $x_e(t)$ at lines 136, 140 multiplied by a respective three bit number $X_o$, $X_e$ from registers 70, 72. Multiplier 82 operates in a similar manner such that by selectively opening and closing switches to the ladder network as a representation of three bit numbers from stroke registers 74, 76, the Y($t$) output is proportional to the sum of the analog inputs $y_o(t)$, $y_e(t)$ at lines 144, 148 multiplied by the respective three bit number from registers 74, 76 ($Y_o$, $Y_e$).

Analytically the X and Y deflection signals X($t$), Y($t$) may be defined thusly:

$$X(t)=K[X_o x_o(t)+X_e x_e(t)]$$
$$Y(t)=K[Y_o y_o(t)+Y_e y_e(t)]$$

Since $x_e=1-x_o(t)$, the value of the horizontal deflection voltage X($t$) is determined solely by the magnitude of $X_e$ when $x_o(t)$ is zero—the condition at the beginning of an odd stroke. Conversely, when $x_e(t)$ is zero, the horizontal deflection voltage is determined by $X_o$. Thus, at the beginning of a stroke, a new three bit number can be inserted from array 50 into the appropriate register 70, 72, 74, 76 to determine the horizontal and vertical coordinate of the stroke destination. Preferably the numbers in registers 70, 72, 74, 76 are not reset completely but merely changed where a change is required by the next number from array 50 as by means of complementing flip-flops.

Parametric equations for each of the stroke types are as follows:

(A) For straight odd strokes $x_o(t)=t/T$ and $$y_o(t)=t/T,$$

where $T$=time duration of one stroke, and:

$$X(t)=K[X_o t/T+X_e(1-t/T)]=K\left[(X_o-X_e)\frac{t}{T}+X_e\right]$$

$$Y(t)=K[Y_o t/T+Y_e(1-t/T)]=K\left[(Y_o-Y_e)\frac{t}{T}+Y_e\right]$$

The above are the parametric equations of a straight line moving from $X_e$, $Y_e$, to $X_o$, $Y_o$.

(B) For straight, even strokes, $x_e(t)=t/T$, $Y_e=t/T$, and:

$$X(t)=K[X_o(1-t/T)+X_e t/T]=K\left[(X_e-X_o)\frac{t}{T}+X_o\right]$$

$$Y(t)=K[Y_o(1-t/T)+Y_e t/T]=K\left[(Y_e-Y_o)\frac{t}{T}+Y_o\right]$$

The above are the parametric equations of a straight line moving from $X_o$, $Y_o$, to $X_e$, $Y_e$.

(C) For curved, odd strokes beginning horizontally (X-fast), $x_o(t)=\sin \omega t$ and $y_o(t)=1-\cos \omega t$, where $\omega=\pi/2T$ and:

$$X(t)=K[X_o \sin \omega t+X_e(1-\sin \omega t)]=K[(X_o-X_e) \sin \omega t+X_e]$$

$$Y(t)=K[Y_o(1-\cos \omega t)+Y_e \cos \omega t]=K[(Y_o-Y_e)(1-\cos \omega t)+Y_e]$$

The above are the parametric equations of a quarter-elliptical section beginning at point $X_e$, $Y_e$ and moving horizontally at first, but ending with a vertical slope at $X_o$, $Y_o$.

(D) For even X-fast strokes, the parametric equations are the same as those for the odd X-fast stroke with the even and odd subscripts interchanged so that the stroke begins at $X_o$, $Y_o$ and ends at $X_e$, $Y_e$.

(E) For curved odd strokes beginning vertically (Y-fast), $x_o(t)=1-\cos \omega t$, $y_e(t)=\sin \omega t$, and:

$$X(t)=K[X_o(1-\cos \omega t)+X_e \cos \omega t]=K[(X_o-X_e)(1-\cos \omega t)+X_e]$$

$$Y(t)=K[Y_o \sin \omega t+Y_e(1-\sin \omega t)]=K[(Y_o-Y_e)(\sin \omega t)+Y_e]$$

These are the parametric equations of a quarter-elliptical section beginning at point $X_e$, $Y_e$ and moving vertically at first, but ending with a horizontal slope at $X_o$, $Y_o$.

(F) For even Y-fast strokes, the parametric equations are the same as those for the odd Y-fast stroke with the even and odd subscripts interchanged so that the stroke begins at $X_o$, $Y_o$ and ends at $X_e$, $Y_e$.

By way for further example, the operation of multiplier 80 for a straight, odd stroke, stroke #3, is illustrated by the waveforms shown in FIG. 5*b*. Assuming the next preceding even stroke, stroke #2, ended at an X coordinate $X_e$ corresponding to a deflection signal designated by numeral 212 and the stroke #3 is to have an end point $X_o$ corresponding to a deflection signal designated by numeral 214. The output $x_o(t)$ at terminal 134 is the increasing portion 172 (FIG. 5*a*) which when multiplied by $X_o$ yields a waveform designated by numeral 216. The output $x_e(t)$ at terminal 138 is the decreasing portion 177 (FIG. 5*a*) which when multiplied by $X_e$ yields a waveform designated by numeral 218. The final X deflection output, $X(t)$, at node 195 is the algebraic sum of the waveforms 216, 218 designated by numeral 220 which will cause the beam to move in a straight line from $X_e$ to $X_o$. Just prior to the beginning of stroke #3 the horizontal deflection voltage $X(t)$ is determined solely by $X_e$ since $x_o(t)$ is zero (portion 171) and the $X_o$ for stroke #3 can be entered into register 70 from array 50. Similarly at the conclusion of stroke #3 the deflection voltage $X(t)$ is determined solely by $X_o$ since $x_e(t)$ is zero (portion 178) and the new $X_e$ can be inserted into register 72. With any given stroke type, either straight or curved, multipliers 80, 82 merely vary the amplitudes of the outputs from terminals 134, 138, 142, 146 in accordance with the end point of the next preceding stroke and the end point of the stroke to be generated.

Referring to the intensity control 34 (FIGS. 1 and 7) the three bit number $X_o$ in register 70 is also transferred to converter 84 and the three bit number $X_e$ from register 72 is also transferred to converter 86. Amplifier 92 derives an output proportional to the analog difference between the three bit numbers in registers 70, 72. In a similar fashion amplifier 96 provides an analog difference signal representing the difference between the three bit numbers in registers 74, 76. Amplifier 92 comprises a pair of NPN transistors 220, 222 which have their emitter-collector circuits biased by a constant current source 224 through emitter bias resistors 226, 228 and collector output resistors 230, 232. The analog output from converter 84 is applied to the base of transistor 220 whereas the analog output from converter 86 is applied to the base of transistor 222. A pair of rectifiers 234, 236 in selection circuit 94 have their anodes connected to the collector of a respective transistor 220, 222 to receive outputs developed across resistors 230, 232. The cathodes of rectifiers 234, 236 are connected together and to line 36 by a conductor 238. Similarly amplifier 96 comprises a pair of NPN transistors 240, 242 biased by a constant current source 244 through emitter bias resistors 246, 248 and collector output resistors 250, 252. The analog output from converter 88 is applied to the base of transistor 240 with the analog output from converter 90 being applied to base of transistor 242. Two rectifiers 254, 256 in selection circuit 94 are biased by an output from a respective resistor 250, 252. Rectifiers 254, 256 are also connected together and to line 36 by a conductor 258. With rectifiers 234, 236, 254, 256 interconnected by conductors 238, 258 the output at line 36 will be proportional to the largest difference between either the analog outputs from converters 84, 86 or the analog outputs from converters 88, 90. This difference signal is applied through line 36 to modulator 30 (FIG. 1) to vary the intensity of the beam in tube 12. Since all strokes require the same amount of time longer strokes require more intensification than shorter strokes. The output from control 34 provides the necessary compensation for intensity variations that would otherwise be present. Compensation in accordance with the largest difference in either the X direction or the Y direction, although not directly proportional to the actual length of the stroke, provides satisfactory visual compensation in the display on screen 12.

With the data display system described herein, a particular symbol is identified to the input circuit 46 of symbol generator 26 by buffer 36 when that symbol is to be displayed. Simultaneously the location at which the symbol is to be displayed is identified to line generator 28 which causes a blanked beam in tube 12 to move to that location. The location specified by line generator 28 is referenced to the center (4, 4 FIG. 2) of a display array 29 corresponding to the number set in registers 70–76 at the completion of the next preceding symbol. When input circuit 46 receives an initiate pulse from programmer 47, core array 50 is set and symbol generator 26 proceeds with the generation of the specified symbol in accordance with the digital stroke signals from core array 50. Any desired symbol can be stored in array 50 with predetermined core patterns to provide the required digital stroke signals when that core pattern is set by input circuit 46. For each stroke, array 50 supplies the required digital signal to function generator 60 and to either registers 70, 74 or registers 72, 76 depending on whether the stroke is odd or even. At the completion of a symbol, registers 70, 72, 74, 76 are reset and buffer 36 proceeds with the next symbol to be displayed. By way of example for one symbol generator a symbol generation time was in the order of fifty microseconds per symbol with equal stroke times for each of the ten strokes equal to one-twelfth of the total symbol generation time. A period of two-twelfths of the total symbol generation time was allotted for miscellaneous operations; for example, setting the cores in array 50 and resetting registers 70–76 to the starting point for each symbol (4, 4 in FIG. 2).

It will be understood that the symbol generator which is herein disclosed and described is presented for purposes of explanation and illustration and is not intended to indicate limits of the invention, the scope of which is defined by the following claims.

What is claimed is:

1. An electronic display system for displaying an item generated in a predetermined sequence of strokes comprising a screen, means for selectively producing a luminous spot on said screen, means for deflecting said spot on screen in response to deflection signals, source means for providing a plurality of control signals each of which represents a stroke in said item, and means responsive to said control signals for selectively generating first, second or third deflection signals, said first deflection signals representing a straight line deflection of said spot to generate a first stroke type, said second deflection signals representing a curved line deflection of said spot beginning in one direction and ending in a generally orthogonal direction to generate a second stroke type, and said third deflection signals representing a curved line deflection of said spot beginning in said orthogonal direction and ending in said one direction to generate a third stroke type, said control signals each having a first component signal identifying one of said stroke types, and a second component signal identifying the location of one extremity of a stroke and independently identifying the location of the other extremity of said stroke thereby defining said stroke.

2. The display system set forth in claim 1 wherein said deflection signal generating means comprises selection means operable in response to said first component signal in each of said control signals to select one of said first, said second, or said third deflection signals identified by said first component signals, and means responsive to said second component signals to vary the amplitude of said deflection signals in accordance with said extremity locations.

3. An electronic display system for displaying an item generated in a predetermined sequence of strokes comprising a screen, means for selectively producing a luminous spot on said screen, means for deflecting said spot on said screen in response to deflection signals, source means for providing a plurality of control signals each of which represents a stroke in said item, and means responsive to said control signals for selectively generating first, second or third deflection signals, said first deflection signals representing straight line deflection of said spot to generate a first stroke type, said second deflection signals representing a curved line deflection of said spot beginning in one direction and ending in a generally orthogonal direction to generate a second stroke type, and said third deflection signals representing a curved line deflection of said spot beginning in said orthogonal direction and ending in said one direction to generate a third stroke type, said control signals each having a first component signal identifying one of said stroke types, a second component signal identifying the location of one extremity of a stroke, said deflection signal generating means comprising selection means operable in response to said first component signal in each of said control signals to select one of said first, said second, or said third deflection signals identified by said first component signal, and means responsive to said second component signals representing one stroke to be displayed and further responsive to another second component signal representing a second stroke adjacent to said one stroke, said last means for varying the amplitude of said deflection signals in accordance with said extremity locations.

4. The display system set forth in claim 3 wherein said second component signals represent end points of strokes, said second stroke precedes said one stroke and said amplitude varying means comprises means operable in response to said other component signal to vary an initial amplitude of a deflection signal for said one stroke and responsive to said one second component signal to vary a final amplitude of a deflection signal for said one stroke.

5. The display system set forth in claim 1 wherein said deflection signal generating means comprises a function generator selectively operable in response to said control signals when a curved stroke is to be displayed to produce a pair of deflection signals one of which varies as in accordance with a sine function and the other of which varies in accordance with a cosine function.

6. The display system set forth in claim 1 wherein said deflection signal generating means comprises a function generator having two pairs of output signals, one output signal in one pair of output signals varying in accordance with a sine function, the other output signal in said one pair being an inverse function of said one output signal, one output signal in the other pair of output signals varying in accordance with a cosine function, and the other of said output signals in said other pair being an inverse function of said one output signal in said other pair.

7. The display system set forth in claim 6 wherein said deflection signal generating means further comprises means for varying the amplitude of a first output signal in each pair of output signals in response to a component of said control signals representing the location of said one extremity of said stroke and for varying the amplitude of a second output signal in each pair representing the location of said other extremity of said stroke.

8. The display system set forth in claim 6 wherein a first one of said output signals varies in accordance with a function sin $\omega t$, a second one of said output signals varies in accordance with a function $1-\sin \omega t$, a third one of said output signals varies in accordance with a function cos $\omega t$, and a fourth one of said output signals varies in accordance with a function $1-\cos \omega t$.

9. The display system set forth in claim 8 wherein said deflection signal generating means further comprises means varying the amplitude of said first and said third output signals in response to a component of one control signal representing the location of said one extremity of said stroke and for varying the amplitude of said second and said fourth output signals in response to a component of a second control signal representing the location of said other extremity of said stroke.

10. The display system set forth in claim 9 wherein said amplitude varying means further comprises means for summing said first and said second output signals and means for summing said third and said fourth output signals.

11. The display system set forth in claim 3 wherein said means for producing said spot comprises means operable in response to a first component signal for said first stroke in said sequence to vary the intensity of said spot in accordance with a displacement between said extremities of said first stroke.

12. In an electronic data display system which includes storage of data having first and second components for displaying a plurality of items at display areas specified by said first components of said data, each of said items being composed of strokes generated in time sequence at one of said display areas, input means operable in response to said second components of said data to identify one of said plurality of items when said one item is to be displayed and to provide a succession of digital signals each of which represents one of said plurality of strokes in said one item to be displayed, each of said successive digital signals for each of said plurality of strokes having first and second digital components, said first digital component identifying either a straight stroke type or a curved stroke type, said second digital component identifying a location in one of said display areas corresponding to an end of said identified one of said plurality of strokes, analog signal generating means responsive to said first digital component for selectively generating either first or second analog signals representing said stroke types independent of said locations, and means responsive to said second digital components to vary the amplitude of said analog signals in accordance with second digital components of adjacent strokes in said succession.

13. The system set forth in claim 12 wherein said second digital components are related to orthogonal axes of said display areas and said amplitude varying means comprises an analog-digital multiplier responsive to said second digital components to multiply said analog signals in accordance with said second digital components.

14. The system set forth in claim 12 wherein said analog signal generating means comprises first and second function generators responsive to said first digital component, each of said generators providing a pair of analog output signals representing one of said stroke types with one analog output signal in each pair being an inverse function of the other analog output signal in that pair.

15. The system set forth in claim 14 wherein said second digital components are related to orthogonal axes of said display areas and said amplitude varying means comprises an analog-digital multiplier responsive to said second digital components of said adjacent strokes to vary the amplitude of said one and said other analog output signals in one pair.

16. The system set forth in claim 14 wherein each of said function generators comprises an integrator and an inverter, each of said inverters being coupled to an output of one of said integrators, said one output signal in each of said pairs being derived from said integrators and the other of said output signals in each of said pairs being derived from said inverters.

17. The system set forth in claim 14 wherein each of said function generators comprises an integrator and an inverter, and said analog signal generating means further comprises an input switching circuit responsive to said first digital components to selectively interconnect said first and said second function generators when a curved stroke type is to be displayed to provide a sine function for one of said output signals in one pair and a cosine function for one of said output signals in the other pair.

18. The system set forth in claim 12 further comprising control means responsive to said second digital components of adjacent strokes to provide a control signal representing a displacement between end locations of said adjacent strokes.

19. A generator adapted to be operably associated with an electronic display to provide analog signals representing strokes in it items to be displayed in response to control signals defining said strokes with said strokes being selected from stroke types including a curved stroke having a horizontal beginning and a horizontal ending comprising a first and second integrating means, first and second inverting means, switching means for selectively connecting said first and second integrating means and said first and second inverting means in a first circuit or in a second circuit, said first circuit representing one of said curved stroke types and including means electrically connecting an output terminal of one integrating means to input terminals of one inverting means and the other of said integrating means, an output terminal of said other integrating means to an input terminal of the other inverting means, and an output terminal of said other inverting means to an input terminal of said one integrating means, and said second circuit representing the other of said curved strokes and including means electrically connecting said output terminal of said first integrating means to said input terminal of said first inverting means, said output terminal of said first inverting means to said input terminal of said second integrating means, and said output terminal of said second integrating means to said input terminals of said first integrating means and said second inverting means, and means coupled to said output terminals of said first and second integrating means and said first and said second inverting means and responsive to said control signals to selectively vary amplitudes of output signals from said output terminals.

References Cited

UNITED STATES PATENTS

| | | | |
|---|---|---|---|
| 3,283,317 | 11/1966 | Courter | 340—324.1 |
| 3,309,692 | 3/1967 | Wilhelmsen | 340—324.1 |
| 3,335,315 | 8/1967 | Moore | 240—324.1 |
| 3,335,416 | 8/1967 | Hughes | 340—324.1 |
| 3,351,929 | 11/1967 | Wagner | 340—324.1 |

JOHN W. CALDWELL, *Primary Examiner.*

A. J. KASPER, *Assistant Examiner.*